United States Patent [19]
Kilner

[11] 3,794,950
[45] Feb. 26, 1974

[54] OVERCURRENT PROTECTION SYSTEM AND SENSOR USED THEREWITH

[75] Inventor: Oliver H. Kilner, Warwick, R.I.

[73] Assignee: Texas Instruments Incorporated, Dallas, Tex.

[22] Filed: Mar. 13, 1972

[21] Appl. No.: 234,257

Related U.S. Application Data

[62] Division of Ser. No. 103,406, Jan. 4, 1971, Pat. No. 3,697,863.

[52] U.S. Cl.................. 338/23, 219/505, 317/9 R, 317/13 C
[51] Int. Cl............................................. H01c 7/04
[58] Field of Search ..... 338/23; 310/68 C; 219/322, 219/501, 504, 505, 210; 29/612, 613; 317/13 B, 13 C, 9 A, 9 R, 9 AC, 33

[56] References Cited
UNITED STATES PATENTS

| | | | |
|---|---|---|---|
| 3,028,473 | 4/1962 | Dyer et al. | 219/210 |
| 3,614,345 | 10/1971 | Quinn | 338/23 |
| 3,243,572 | 3/1966 | Vogt et al. | 219/505 X |
| 3,444,399 | 5/1969 | Jones | 219/210 X |
| 2,253,577 | 8/1941 | Pearson et al. | 338/23 |
| 2,375,497 | 5/1945 | Scully | 219/505 |
| 3,426,441 | 2/1968 | Broski | 219/505 X |

Primary Examiner—C. L. Albritton
Attorney, Agent, or Firm—John A. Haug; Edward J. Connors, Jr.; James P. McAndrews

[57] ABSTRACT

An overcurrent sensor adapted to cooperate with a controller to control the power to a load is shown. In the embodiment illustrated, the controller is an electrical switching means to which the overcurrent sensor furnishes a passive signal in the form of circuit resistance to cause the controller to operate to decrease or increase electrical power to the load circuit at desired current values. The overcurrent sensor comprises a PTC (Positive Temperature Coefficient) thermistor or an NTC (Negative Temperature Coefficient) thermistor mounted in heat transfer relation, through a layer of electrical insulation, with a first heater which is electrically connected in series with an electrical load, and a heat sink member mounted in heat transfer relation through a layer of electrical insulation with the series heater to provide means for changing the transient response time of the thermistor to the series heater current. A second heater is optionally mounted in shunt relation to the first heater to provide a means of increasing the steady state current at which the controller operates, above that obtained solely with the first heater while maintaining approximately unchanged the transient response time of the thermistor assembly for corresponding overload currents.

13 Claims, 12 Drawing Figures

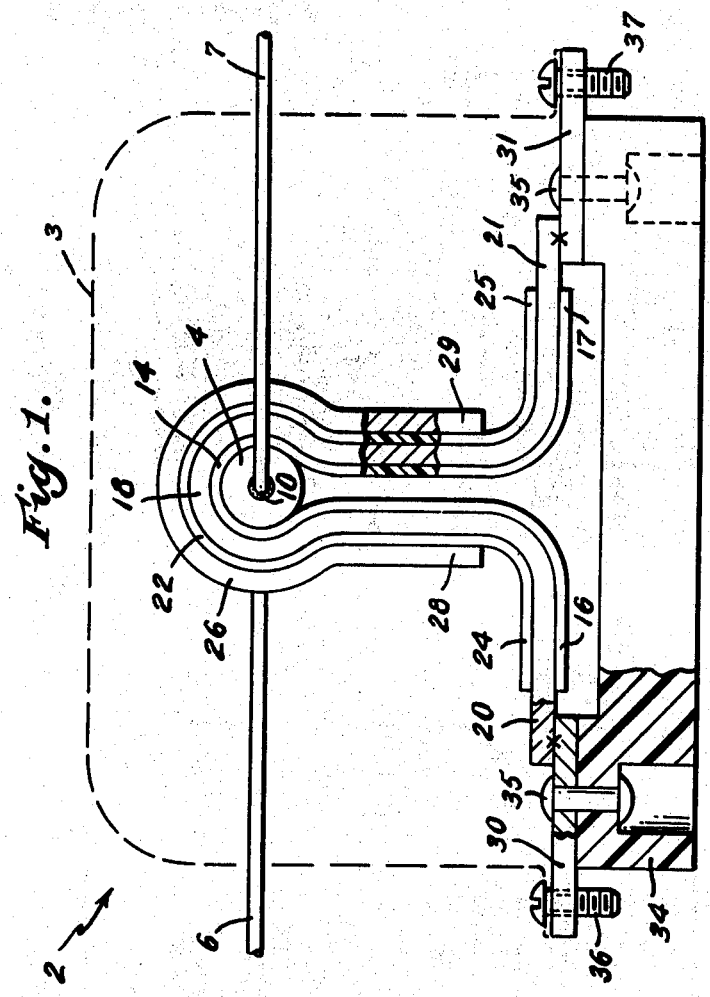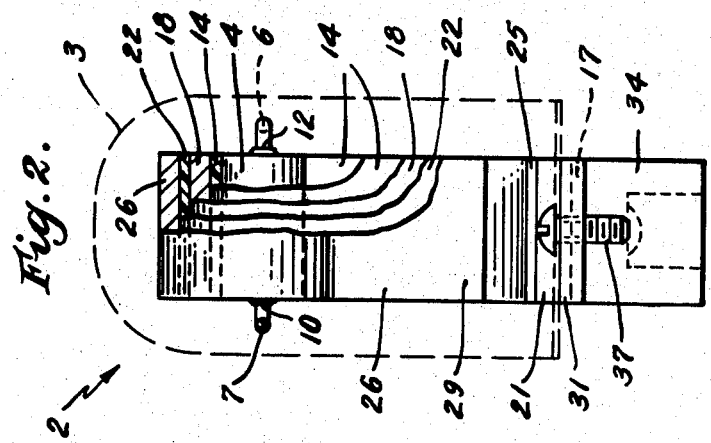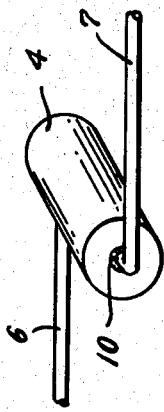

PATENTED FEB 26 1974    3,794,950

OVERCURRENT PROTECTION SYSTEM AND SENSOR USED THEREWITH

This is a divisional application of copending application Ser. No. 103,406 filed January 4, 1971, now U.S. Patent No. 3,697,863.

This invention relates to an overcurrent sensor comprising a thermistor and heat source and to such a sensor used with a controller to control the operation of an electrical load at selected values of heater current corresponding to the resistance of the sensor, which is related to heater current, and coupled physically, electrically or both with the controller. Among the several objects of the invention is the provision of a small compact sensor assembly which can be readily installed and removed for replacement as needed to provide the desired electrical steady state operating current, which is commonly called ultimate trip current, appropriate for the load with which it is used. A further object is the provision of an overcurrent sensor which can be designed to reach its operating point for a wide range of response times, called short time trip, on a desired value of overload current, which is a current exceeding steady state operating current or ultimate trip current. Another object is the provision of an overcurrent sensor which will have a short trip time at a desired value of overload current. Still another object of the invention is the provision of an overcurrent sensor which will minimize nuisance operation due to premature operation of the controller on overload currents when the load is cyclic, intermittent or repetitive. A further object is the provision of an overcurrent sensor in which the steady state operating current, ultimate trip current, can be increased with no or little change in short time trip time for corresponding overload currents expressed as a percent of ultimate trip current.

Other objects and features will be in part apparent and in part pointed out hereinafter.

Conventional state of the art overcurrent sensors of the thermal type incorporating bimetallic or eutectic alloy elements have design limitations and difficulties in achieving a short time trip of two to three seconds in the initial heating cycle from a cold start such as from 40°C. room ambient temperature on loads of 600 percent of the ultimate trip current of the sensor. Typical industry standards for thermal overload (overcurrent) sensors specify a maximum short time trip of 30 seconds on an overload current of 600 percent of ultimate trip current for standard sensors and short time trip of approximately 10 seconds for so called quick trip devices on the same overload current. These short times are related to the heating rate of electric motor windings on stalled rotor for a typical motor design where stalled current is approximately 600 percent of motor nameplate full load amperes. In contrast, semiconductor power switching devices such as thyristors and triacs, which may be used to control motor loads, have limited thermal capacity on overloads, which are currents exceeding their maximum continuous operating current rating, and reach damaging temperatures in shorter time than electric motors on a similar magnitude of overload. For example, with an overload of 600 percent of maximum continuous operating current rating at an ambient temperature of 40°C., the thyristor or triac circuit must have its power decreased in 2 to 3 seconds compared to the 10 seconds or longer time acceptable to many electric motors carrying stalled current at 600 percent of motor nameplate full load amperes and which latter time is provided by conventional motor overload (overcurrent) devices. It will be apparent from the following that the present invention obviates the disadvantages of prior art structures and provides the desired fast short time trip times.

The present invention, while having more general uses, is particularly useful for protecting against overcurrent electric motors as well as semiconductor power switching devices.

The invention accordingly comprises the elements and combination of elements, features of construction, and arrangements of parts which will be exemplified in the structures hereinafter described and the scope of which will be indicated in the appended claims.

In the accompanying drawings in which several of the various possible embodiments of the invention are illustrated:

FIG. 1 is an enlarged view of an overcurrent sensor according to the present invention broken away to expose various parts.

FIG. 2 is a side elevation of FIG. 1 with parts broken away.

FIG. 3 is an enlarged perspective view of a thermistor with leads attached.

Similar reference characters indicate corresponding parts throughout the several views of the drawings.

Figure 4:
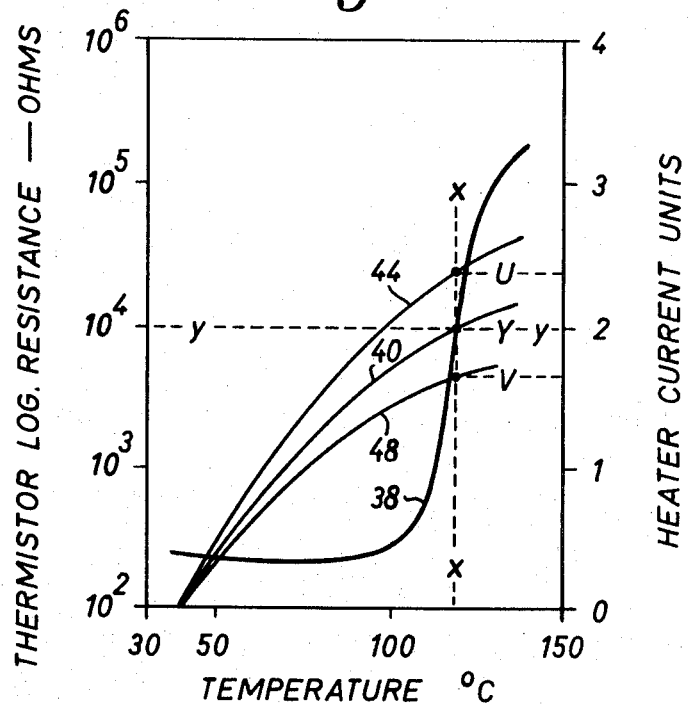
FIG. 4 shows a curve of log resistance v. temperature for a PTC (positive temperature coefficient) thermistor and curves of heater current v. temperature.

Dimensions of certain of the parts as shown in the drawings have been exaggerated or modified for purposes of clarity of illustration.

Referring to the drawings, particularly FIGS. 1–3, there is shown a first embodiment of the present invention in the form of an overcurrent sensor generally indicated by numeral 2 comprising a cover 3, a thermistor 4 of PTC material, which may be in the form of a cylindrical rod and which will be described later, with leads 6 and 7 providing electrical series connections to the thermistor at spaced points 10 and 12 respectively; a first layer 14 of insulation which may be made of electrically insulating material with a desired temperature rating, such as a polyimide film, draped or wrapped about and in contact with thermistor 4 extending out therefrom to ends 16 and 17; a first elongated heater 18 formed with a loop to receive thermistor 4 therein. Heater 18 may be made of appropriate high electrical resistance material such as nickle-chromium alloy having inner and outer surfaces, the inner surface maintained contiguous to thermistor 4 in contact therewith through first layer 14 of insulation by spring tension or other appropriate means and having legs terminating in free distal ends 20 and 21 extending out therefrom; a second layer of insulation 22 which may be made of material similar to layer 14 previously described, draped or wrapped about the outer surface of heater 18 and extending outward to ends 24 and 25, and elongated sink 26 which may be made of metal such as copper wrapped about the outer surface of heater 18 contiguous thereto in contact with the second layer of insulation 22 by spring tension or the like and extending outward to ends 28 and 29. In addition to or in place of spring tension provided by heater 18 and heat sink 26, a layer or dip coating of an adhesive such as electrical varnish can be applied to establish proper heat flow between aforesaid components as well as to hold aforesaid parts together. The several layers for a generally U-shape configuration with the bight portion in close heat transfer relation with thermistor 4 and supported by outwardly extending ends 20 and 21 of heater 18.

A support 34, which may be made of conventional electrically insulative molded phenolic material, provides a means of attachment for the sensor components and may also provide for the locating and fastening of the sensor in its installed location. Weld or terminal pads 30 and 31, comprising a conductive material such as brass, are attached to support 34 by conventional means such as rivets 35 and additionally are electrically connected to heater ends 20 and 21, such as by welding. An appropriate cover 3 is shown generally by the broken outline. Terminals (not shown) for connection to lead ends 6 and 7 of thermistor 4 can be installed at any convenient location including support 34 on other appropriate means for external circuit connection such as pressure connectors can be used.

Thermistor 4 may be made of positive temperature coefficient (PTC) material such as a lanthanum doped barium titanate for which a typical curve 38 of log resistance v. thermistor temperature is shown in FIG. 4. Characteristic of this material is an anomaly where its ohmic resistance increases by several orders of magnitude over a small change in temperature and which, for the material illustrated, occurs at approximately 115°–120°C. Different anomaly temperatures may be obtained by use of different amounts or kinds of dopants in making the thermistor materials.

Figure 5:
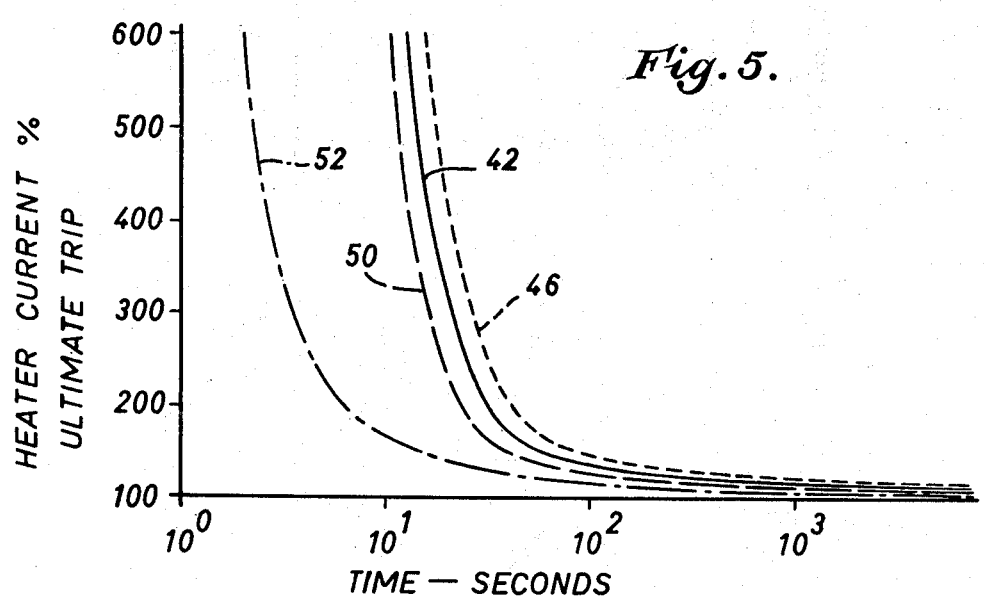
FIG. 5 shows curves of time for thermistor to reach anomaly range v. percent heater ultimate trip current.

Current flow through heater 18 will raise heater temperature and thereby temperature of the thermistor. Relationship of continuous heater current and steady state heater temperature in a test ambient of 40°C. is shown in FIG. 4 by temperature curve 40 for a particular heater. Steady state temperature of thermistor 4 corresponds to the temperature of heater 18 except for a small gradient. Thus, approximately 2 units of current for heater temperature curve 40 will raise the temperature of thermistor 4 into its anomaly point of 120°C. resulting in a thermistor resistance of $10^4$ ohms. This is shown by dotted lines $x$—$x$ and $y$—$y$ in FIG. 4 and the current is identified as ultimate trip current Y. If a current exceeding ultimate trip current Y is passed through heater 18, the thermistor temperature will reach the anomaly point of 120°C. in some finite time which is also known as short time trip and this time will decrease as the heater current is increased. By assigning a value of 100 percent to ultimate trip current Y, the curve 42 in FIG. 5 of percent heater ultimate trip current Y v. time from 40°C. for the thermistor to reach the anomaly point of 120°C. is obtained. At 600 percent ultimate trip current Y for curve 42, short time trip for thermistor to reach anomaly range 120°C. is approximately 12 seconds. If an increase in ultimate trip current is desired greater than Y, the ohmic resistance of heater 18 would be decreased such as by substituting a heater material of increased thickness. Curve 44 FIG. 4 shows the relationship of continuous heater current and steady state heater temperature at an ambient temperature of 40°C., for a heater of increased thickness material, which raises the thermistor to its anomaly range 120°C. at ultimate trip current U. Curve 46, FIG. 5, shows percent heater ultimate trip current U v. time for the thermistor to reach anomaly point of 120°C. At 600 percent ultimate trip current U for curve 46, short time trip for thermistor to reach anomaly range 120°C. is typically longer than the time from curve 42 at 600 percent ultimate trip current Y and this results from an increase in the mass of the corresponding heater. Similarly, for a desired decrease in ultimate trip current below Y, the ohmic resistance of heater 18 would be increased such as by substituting a heater material of decreased thickness. Curve 48, FIG. 4, shows the relationship of continuous heater current and steady state heater temperature at an ambient temperature of 40°C. for a heater of decreased thickness material which raises the thermistor to its anomaly point of 120°C. on ultimate trip current V. Curve 50, FIG. 5, shows percent heater ultimate trip current V v. short time trip for the thermistor to reach the anomaly point of 120°C. At 600 percent ultimate trip current V for curve 50, time for the thermistor to reach the anomaly point of 120°C. is typically shorter than the time for curve 42 at 600 percent ultimate trip current Y. As seen, the overcurrent sensor, with a PTC thermistor as described so far, will reach its anomaly range at a desired ultimate trip current and a change in ultimate trip current will result in a change in corresponding short time trip.

To reduce the short time trip for thermistor 4 to reach its anomaly temperature on 600 percent ultimate trip current appreciably below the 12 seconds of curve 42, a heater of reduced cross section could be used by using a material of lower resistivity. Another way of reducing transient response time is to provide a non-uniform cross-section to the heater with a reduced section contiguous with the thermistor and an increased section elsewhere. Both of these heater modifications result in an increase in the rate of temperature rise of the heater at the thermistor and, therefore, a decrease in short time trip for the thermistor to reach its anomaly range which is shown by curve 52, FIG. 5. However, because of the existence of a temperature gradient, even though it is small, between heater 18 and thermistor 4, the increased rate of temperature rise in the heater for curve 52 results in the heater attaining a temperature value exceeding the temperature of the thermistor at overload currents such as 600 percent ultimate trip. This overshoot in heater temperature beyond the thermistor temperature is objectionable because it can result in the first insulation 14 reaching a damaging level or in the thermistor reaching its anomaly range temperature prematurely. To attain a short time trip as short as 2 to 3 seconds at 600 percent ultimate trip current, it is desirable to minimize this temperature overshoot characteristic. By means of the instant invention this is accomplished by the addition of the previously described heat sink 26 which is in good heat transfer relationship with heater 18 contacting it through second insulation 22. The affect of heat sink 26 is to quickly reduce the temperature of heater 18 when the current in the heater is reduced after thermistor 4 reaches its anomaly range, so that the heater temperature will be below the maximum allowable limits for first insulation 14, for thermistor 4, and for second insulation 22, to prevent these components from undergoing excessive thermal degradation and damage.

Figure 6:
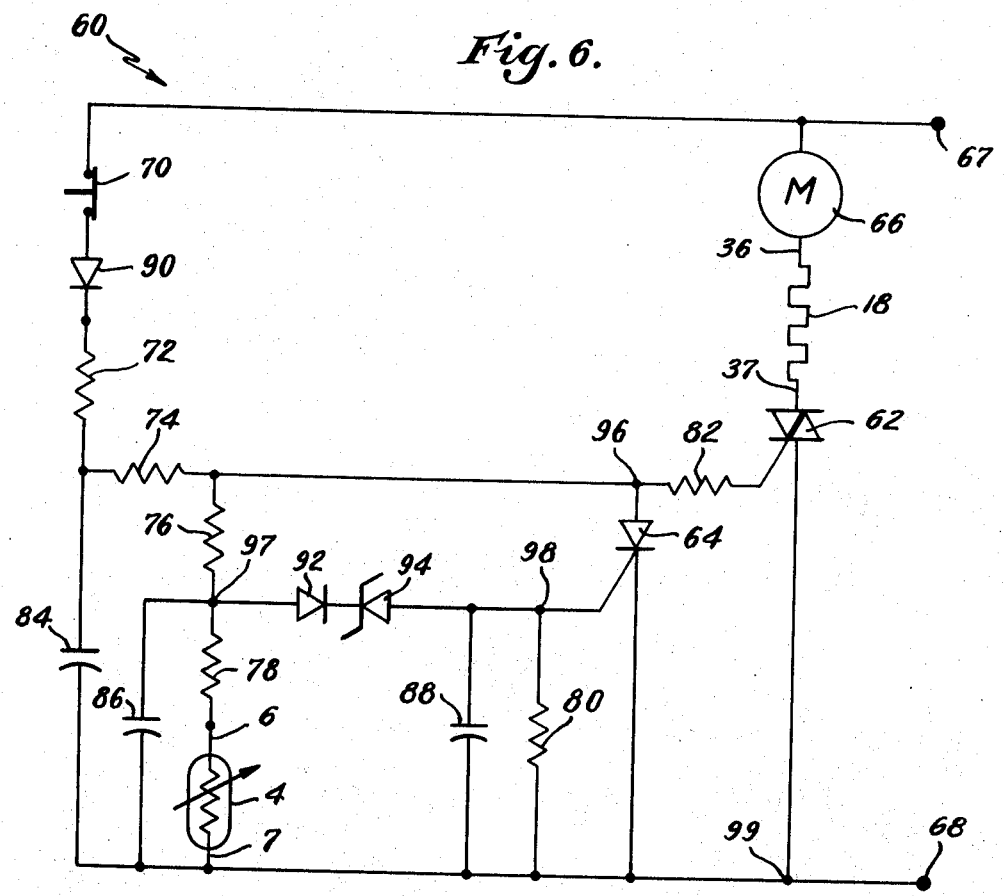
FIG. 6 is a schematic wiring diagram of a typical electrical controller and its electrical load including an overcurrent sensor.

Overcurrent sensor 2 would usually be electrically connected into an electrical controller circuit. A typical controller circuit providing an electrical control function is shown generally by numeral 60, FIG. 6, where an increase or decrease in power supplied to the load is provided by bidirectional thyristor (commonly referred to as triac) 62 gated by thyristor 64. The electrical load which can be a motor 66 is shown supplied from the same power source 67 and 68 as electrical controller 60. Overcurrent sensor 2 is connected in the controller circuit so that heater 18 is in series with motor load 66 by means of terminal connections screws 36 and 37. PTC thermistor 4 is connected into the electrical controller circuit as shown in FIG. 6 by means of leads 6 and 7. The remaining controller circuit components are push button 70, resistors 72, 74, 76, 78, 80, 82, capacitors 84, 86, 88, diodes 90, 92 and zener diode 94. One set of typical values for the circuit components are as follows:

| Item | Value | Item | Value |
|---|---|---|---|
| 72 | 1k ohms | 84 | 10 mf |
| 74 | 3.3k ohms | 86 | .22 mf |
| 76 | 22k ohms | 88 | .22 mf |
| 78 | 1k ohms | | |
| 80 | 10k ohms | | |
| 82 | 1k ohms | | |

Items 90, 92, 94, 62, 64 are rated as required. Controller operation is described starting with all components and thermistor 4 at a room ambient temperature such as 40°C. and with motor 66 unloaded. At this temperature, thermistor 4 is at a low level of resistance such as 500 ohms. On energizing power source 67, 68, a voltage is imposed across circuit points 96, 99 which is of the proper value for gating bidirectional thyristor 62 into its low impedance state thereby permitting power to be supplied to the motor. Voltage difference between circuit points 97, 98 is below the breakover voltage of diode 92 and zener 94 so that current in the gate circuit of thyristor 64 is below its switching level and thyristor 64 is therefore in its high impedance state. With continuous motor current flowing through overcurrent sensor heater 18, heater temperature and thus thermistor temperature will increase such as shown by curve 40, FIG. 4. An increase in power to the motor results in an increase in current through the heater and thereby an increase in resistance of thermistor 4 according to curve 38 which in turn increases the voltage across capacitor 86. The controller circuit is calibrated by selection of resistances 76, 78 so that when thermistor 4 reaches its anomaly point of 120°C. with a resistance of $10^4$ ohms at ultimate trip Y current, the voltage across capacitor 86 is sufficient to switch diode 92 and zener 94 into their low impedance states thereby imposing a voltage across circuit points 98, 99 of the appropriate value for gating thyristor 64 into its low impedance state. This results in reducing the voltage across circuit points 96, 99 which reduces the gate current of thyristor 62 resulting in thyristor 62 switching into its high impedance state which reduces power supplied to motor 66. Controller circuit 60 will remain in this mode as long as it is energized. Resetting is accomplished by interrupting power source 67, 68 or by opening the controller circuit by means of push button switch 70. This allows capacitor 86 to discharge so that diode 92 and zener 94 will switch to their high impedance states which reduces gate voltage at thyristor 64 so that it switches into its high impedance state. This permits voltage to reappear across circuit points 96, 99 of an appropriate value to gate bidirectional thyristor 62 into its low impedance state to increase power supplied to motor 66.

Operation at motor loads resulting in current exceeding ultimate trip current such as ultimate trip Y is defined by curve 42, FIG. 5. For example, a motor with a stalled rotor current of 600 percent ultimate trip current would result in controller 60 reducing power to the motor in approximately 12 seconds starting from 40°C. ambient temperature. This is obtained since this is the short time trip for thermistor 4 to reach its anomaly point of 120°C. at which point controller circuit 60 is calibrated for switching thyristor 62 into its high impedance state.

Different motor loads are accommodated by means of heaters having different characteristics than heater 18 to provide the desired ultimate trip current in overcurrent sensor 2. Examples of two such changes are ultimate trip U and V shown by curves 44, 48 and short time trip times shown by curves 46, 50 respectively.

Bidirectional thyristors such as 62 typically are limited by internal heating. When conducting a power load such as 600 percent of thyristor continuous current rating, the maximum allowable conduction time is considerably shorter than the maximum time during which typical motors may safely remain on stalled rotor without overheating. Because of this, it is common to use thyristors with a continuous current rating exceeding the motor nameplate rated load current since overcurrent sensors typically used with motors provide tripping times related to the motor temperature limitations. Thyristors, at these current levels, generally need to be limited to a conduction time of approximately 2 seconds versus approximately 15 seconds for motors, at 40°C. ambient temperature. In many motor applications, of which a refrigerant compressor is one example, the nature of the motor load is such that the motor generally reaches normal operating speed in less than 1 second; otherwise, an abnormal condition would be expected to exist. These may be a mechanical binding within the compressor or low voltage at the motor terminals which would prevent the motor from starting or running properly. In this case, a short time trip of 2 seconds, as shown in curve 52, FIG. 5, for overcurrent sensor 2 with heat sink 26, FIG. 1, to reach the anomaly range to cause controller 60, FIG. 6, to reduce power supplied to load 66, would protect thyristor 62 as well as motor 66 against excessive temperature. Thyristors rated in accordance with motor nameplate current rating could be safely used which would result in a substantial cost savings because of a lower rated thyristor resulting in another advantage of the instant invention.

One of the design problems concomitant with changing heater 18 to increase or decrease ultimate trip current Y of overcurrent sensor 2 in the manner previously described is that the short time trip curve such as 52 will also change. In some cases it may be desirable to maintain the short time trip curve essentially unchanged. This is provided by a second embodiment of overcurrent sensor shown generally at numeral 100, FIG. 7. This second embodiment overcurrent sensor 100 comprises similar components to those of sensor 2, namely, cover 3, thermistor 4, first and second layers of insulation 14, 22, heater 18, heat sink 26, support 34, weld pads 30, 31 and terminal screws 36, 37 and an additional shunt 102 connected electrically in parallel with heater 18 at weld pads 103, 104 such as by welding. The particular physical location of the components and their characteristics results in either a negligible or a desirable amount of heat from shunt 102 to be conducted to heat sink 26 and heater 18. Since shunt 102 and heater 18 are essentially pure resistance at the frequencies of the power source 67, 68 with which they would normally be used, such as d.c. through 400 cycles per second, the division of current between the two circuits by Ohms Law is given by:

$$Is/Ih = rh/rs \text{ and } IL = I_h (Rh+Rs/Rs)$$

where
- $Is$ = current in shunt
- $Ih$ = current in heater
- $Rs$ = resistance of shunt
- $Rh$ = resistance of heater
- $IL$ = current between terminals 36, 37

Heater 18 is selected to provide the minimim contemplated ultimate trip current such as Y from curve 40, FIG. 4, and the required short time trip on overload current such as curve 52, FIG. 5. Thermistor 4 will reach its anomaly point of 120°C whenever continuous current in heater 18 is at ultimate trip current Y. The corresponding current in the circuit supplying power to the motor, in which overcurrent sensor 100 is connected, is determined by the resistances of shunt 102 and of heater 18. In a design in which negligible heat is transferred from shunt 102 to heater 18, temperature of thermistor 4 is determined essentially by continuous current through heater 18, such as from curve 40, FIG. 4, and is independent from current in shunt 102, FIG. 7. Short time trip operation is given by curve 52, FIG. 5, directly in terms of percent $IL$ at ultimate trip since the division of current between $IL$, $Ih$ and $Is$ is linear for all values of $IL$. This relationship is seen from the data recorded on a series of overcurrent sensors 100 as follows:

| Sensor No. | Heater 18 resistance | Shunt 102 resistance | IL Ultimate Trip | Short Time Trip Time to Anomaly Range at 480% IL Ultimate Trip |
|---|---|---|---|---|
| 1 | .275 ohms | * | 1.65 amps | 2.2 Secs. |
| 2 | .275 ohms | .0909 ohms | 6.66 amps | 2.2 Secs. |
| 3 | .275 ohms | .057 ohms | 9.57 amps | 2.2 Secs. |
| 4 | .275 ohms | .038 ohms | 13.3 amps | 2.2 Secs. |
| 5 | .275 ohms | .029 ohms | 16.9 amps | 2.2 Secs. |

* No Shunt

Further, the objective of approximately constant short time trip in terms of percent $IL$ (ultimate trip) for different resistance values of shunt 102 used with a desired thermistor 4, heater 18, insulation layers 14, 22 and heat sink 26 is also obtained when the design permits transfer of heat from shunt 102 to heater 18. The invention, therefore, includes in second embodiment overcurrent sensor 100 a modification in which finite heat transfer takes place from shunt 102 to heater 18. This is demonstrated by another similar group of overcurrent sensor samples 100 where heater 102 is in the form of a spiral coil surrounding heat sink 26, heater 18 and thermistor 2 and the data obtained is as follows:

| Sensor No. | Shunt 102 resistance | IL Ultimate Trip | Transient Response Time to Anomaly Range at 480% IL (Ultimate Trip) |
|---|---|---|---|
| 10 | .527 ohms | 2.15 amps | 2.1 Secs. |
| 11 | .158 ohms | 3.0 amps | 2.1 Secs. |
| 12 | .121 ohms | 3.8 amps | 2.0 Secs. |
| 13 | .070 ohms | 5.4 amps | 2.0 Secs. |
| 14 | .044 ohms | 8.05 amps | 2.0 Secs. |

If the temperature of thermistor 4 were independent of heat generated in shunt 102, then $IL$ (ultimate trip) would be calculable from the resistance of a new shunt 102 ($rsx$) and that of a sensor with shunt resistance ($rs$), heater resistance $rh$ and known $IL$ (ultimate trip) from a formula as follows:

$$IL \text{ (ultimate trip)(for shunt } rsx) = I_L(\text{ultimate trip})(\text{for shunt } rs)\ (rs)/(rsx)\ (r_h + rsx)/(r_h + rs )$$

$IL$ (ultimate trip) for No. 11 in the above table based on a shunt resistance of 0.158 ohms referred to No. 10 with a shunt resistance of 0.527 ohms and $IL$ (ultimate trip) of 2.15 amps has a calculated value of 3.86 amps compared to a measured value of 3.0 amps. Since a linear relationship exists between currents in the line, shunt and heater, it follows that current in heater 18 is (3.0/3.86) 100 or 78 percent of the expected value when thermistor 4 is at its anomaly point of 120°C. for $IL$ (ultimate trip). Referring to FIG. 4, curve 40, which has been used in previous examples, a heater current of 78 percent of ultimate trip current Y would raise the heater temperature to approximately 103°C. Since thermistor 4 is at its anomaly point of 120°C., heater 18 must also be 120°C. and it follows that heat transferred from shunt 102 is providing an indicated temperature rise of 17°C. at ultimate trip current Y. At 480 percent $IL$ (ultimate trip) for which a short time trip of 2.1 seconds is shown in the preceding data for sensor No. 11 the current in the heater is (480 percent) (78 percent) or 375 percent of its expected value. Referring to FIG. 5, curve 52, the expected short time trip is indicated as approximately 2.8 secs. It is apparent that heat is transferred from shunt 102 to thermistor 4 and heater 18 in order to obtain the shorter time of 2.1 seconds recorded in the test data. A similar analysis can be made for the remaining samples No. 12, 13, 14 where it will be seen that heat is transferred from shunt 102 to heater 18 and thermistor 4 at ultimate trip current Y. The desired value of short time as a percent of $IL$ (ultimate trip) is maintained approximately constant for different shunts 102 where heat is transferred from the shunt to heater 18. This is confirmed by the test data which shows short time trip times of 2.0 to 2.1 seconds at 480 percent IL (ultimate trip) for samples No. 11 through 14 and is in accordance with an objective of the present invention.

Figure 7:
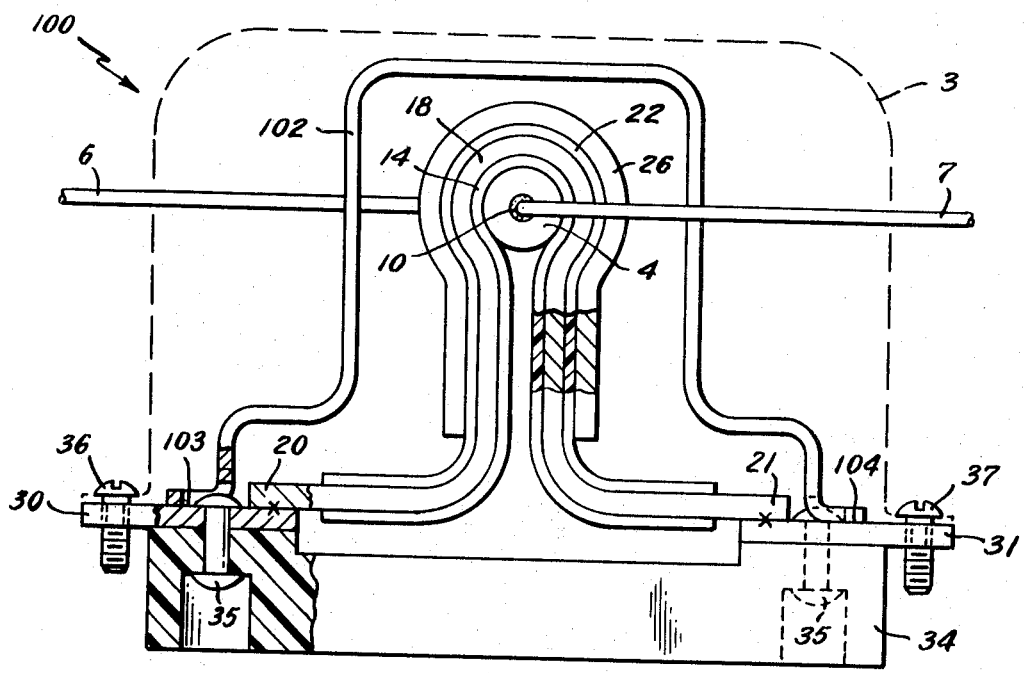
FIG. 7 is an enlarged view of a second embodiment of an overcurrent sensor according to the present invention broken away to expose verious parts.

Overcurrent sensor 100, FIG. 7, is electrically connected into an electrical controller circuit similarly to first embodiment overcurrent sensor 2, FIG. 1. Heater 18 and shunt 102 through terminals 36, 37 are connected in series with motor 66 and along with PTC thermistor 4 are connected into electrical controller circuit 60, FIG. 6. Operation with electrical controller 60 is also similar to that previously described for overcurrent sensor 2 and hence the description will not be repeated. Inasmuch as overcurrent sensor 100 operates in cooperation with electrical controllers such as controller 60 another object of the invention is met.

Overcurrent sensor 100 can be modified by omitting heat sink 26 and the second layer of insulation 22 where short time trip requirements are appropriately long so that overheating of insulation layers 14, 22 and of thermistor 4 is not a problem.

Figure 11:
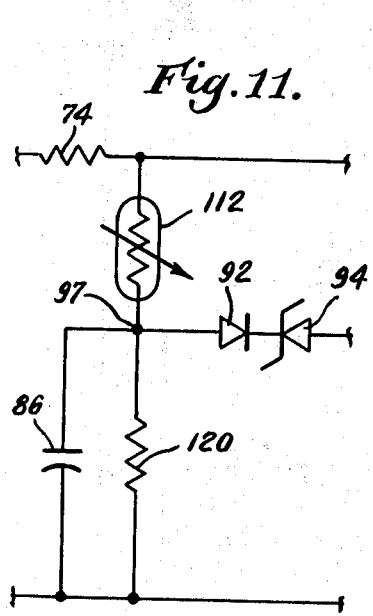
FIG. 11 is a partial schematic wiring diagram showing a modification of FIG. 6 with an NTC thermistor of an overcurrent sensor connected into the circuit.
Figure 10:
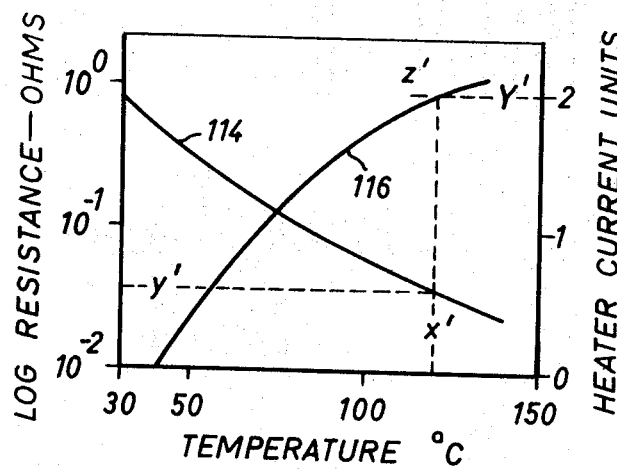
FIG. 10 shows a curve of log resistance v. temperature for a typical NTC (negative temperature coefficient of resistance) thermistor and a curve of heater current v. temperature.
Figure 8:
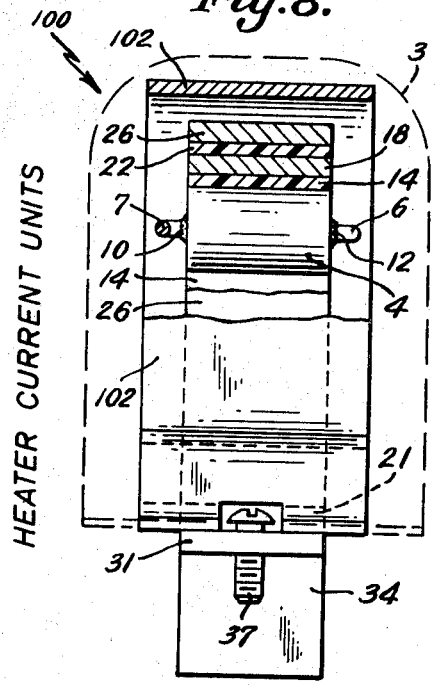
FIG. 8 is an end view of FIG. 7 with parts broken away.

First and second embodiment overcurrent sensors 2 and 100 may also be modified by substituting a negative temperature coefficient of resistance (NTC) material, such as nickel oxide - manganese oxide, for the positive temperature coefficient of resistance (PTC) material previously described for thermistor 4 and the resulting overcurrent sensor, otherwise the same as overcurrent sensor 2, FIG. 2, will be called overcurrent sensor 110 (not shown) and its thermistor (NTC) 112, FIG. 11. Curve 114, FIG. 10, shows typical characteristics of log resistance v. temperature of thermistor (NTC) 112. Curve 114 indicates thermistor (NTC) 112 resistance of 0.035 ohms at 120°C. which will be referred to as operating point 120°C. and is shown by dotted lines $x'$ and $y'$. The relationship of heater 18 current and steady state thermistor (NTC) 112 temperature in an ambient temperature of 40°C. is shown by temperature curve 116 for a heater selected so that two units of current raise the temperature of thermistor (NTC) 112° to 120°C. as shown by dotted lines $x'$ and $y'$. This current valve is identified as ultimate trip $Y'$.

At heater currents exceeding ultimate trip $Y'$, thermistor (NTC) 112 will reach its operating point 120°C. in some finite time and this time, which is similar to previously identified short time trip, will increase as the heater current is increased. Operation of overcurrent sensor 110 is similar to that previously described for overcurrent sensor 2 to which reference may be had for details. Desired values for ultimate trip $Y'$ as well as for short time trip on a percentage of ultimate trip $Y'$ current are obtained similarly to that previously described for overcurrent sensor 2.

However, a change is made in controller circuit 60, FIG. 6, with which overcurrent sensor (NTC) 110 will be used. Referring to FIGS. 6 and 11, thermistor (NTC) 112 is connected in the circuit in place of resistor 76 and a resistor 120 which is used to calibrate the operating point of the circuit replaces thermistor 4 and resistor 78. Otherwise controller circuit 60 is unchanged and heater 18 is located at the same point in circuit 60 as shown in FIG. 6. Modified controller circuit 60 is calibrated so that, when thermistor (NTC) 112 of overcurrent sensor 110 reaches a value of resistance corresponding to its operating point 120°C. at ultimate trip $Y'$ current, thyristor 64 switches into its low impedance state which reduces the voltage available at the gate of bidirectional thyristor 62 so that thyristor 62 assumes its high impedance state. The circuit is resettable through push button switch 70 when thermistor (NTC) 112 has cooled, increasing its resistance which lowers the voltage across capacitor 86, to a point at which zener diode 94 assumes its high impedance state. Operation of modified overcurrent sensor (NTC) 110 with a thermistor 112 of NTC material is similar to that previously described for overcurrent sensors 2 and 100 with thermistors of PTC material at ultimate trip currents as well as at currents exceeding ultimate trip and therefore the description will not be repeated.

Figure 9:
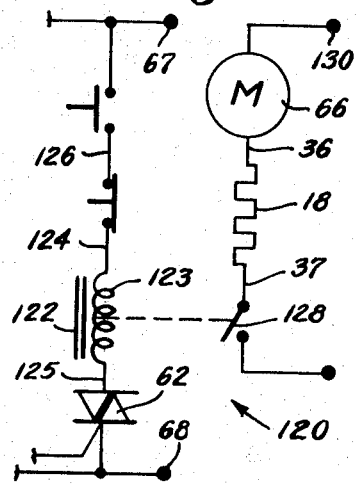
FIG. 9 is a partial schematic wiring diagram showing a modification of the circuit shown in FIG. 6.

It is also within the purview of the invention to employ a separate or different power source for energizing motor 66 in series with heater 18 than that energizing the circuit of electrical controller 60, FIG. 6. This is shown in modified controller circuit 120, FIG. 9, otherwise the same as controller circuit 60, FIG. 6, containing push button station 126 and an automatic switching device such as magnetic contactor 122 comprising coil 123 with circuit connections 124, 125 and load switch 128. Contactor 122 is connected into controller circuit 120, FIG. 9, so that coil 123, in series with push button station 126, is in series with bidirectional thyristor 62 in a circuit connected to power source 67, 68. Load switch 128, in series with motor 66 and heater 18, is in a circuit connected to a second power source 130, 131 which may be different than power source 67, 68. Operation is similar to that previously described for controller circuit 60, FIG. 6, except that in modified controller circuit 120, bidirectional thyristor 62, when in its low impedance state, energizes coil 123 of magnetic contactor 122 energizing the motor and heater through load switch 128. Conversely, when bidirectional thyristor 62 is in its low impedance state, load switch 128 is open circuited deenergizing the motor and heater. Thus it will be seen that the overcurrent sensor of the instant invention also cooperates with an electrical controller even though the power source for the controller and the load is either separated or different.

The previously described characteristic of overcurrent sensor 2, provided by heat sink 26 in limiting temperature overshoot from heater 18 on currents exceeding ultimate trip current, results in the sensor being particularly adaptable for use with motors operating at high cyclic loads or with frequent starting and stopping such as in jogging or reversing operation. Since heat sink 26 effectively lowers the temperature of the heater and thermistor by increasing the heat loss from the sensor it follows since the thermistor is less likely to overshoot its anomaly point following cutoff of the cyclic or intermittent high motor current to the sensor heater. This avoids so called nuisance operation obtained with conventional bimetallic and eutectic alloy overcurrent sensors where the heater temperature increases on repetitive cycles at a faster rate than required for protection of the motor or where the temperature override of the heater is high in relation to the bimetal or eutectic alloy so that heat transfer continues after motor current is shut down which results in unnecessary sensor operation.

Figure 12:
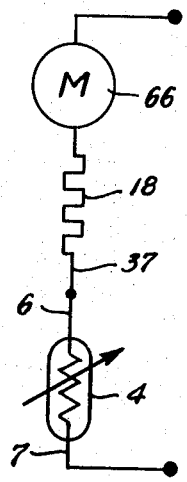
FIG. 12 is a schematic wiring diagram of an overcurrent sensor with PTC thermistor in series with an electrical load.

Overcurrent sensors 2 and 100 may be used without electrical controllers directly with small loads such as fraction horsepower electric motors. In this use, a PTC thermistor with a low value of resistance approximately one one-hundredth of the value shown in curve 38, FIG. 4, would be used for thermistor 4 and with heater 18 is connected in series with the motor load 66 as shown in FIG. 12. When thermistor 4 reaches it anomaly range, the high increase in its resistance of approximately three orders of magnitude, reduces the power supplied to the motor circuit to a low value so that the motor does not run or overheat and the sensor performs its intended function. When thermistor 4 has cooled and its resistance has returned to its former low level, power supplied to the motor is increased so that it will again operate.

As many changes could be made on the above constructions without departure from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

What is claimed is:

1. An overcurrent sensor assembly to control the operation of an electrical load having a selected ultimate trip current level and a selected short trip time at corresponding values of overload current comprising
   a temperature dependent thermistor having an outer peripheral surface,
   electrical leads connected to spaced portions of the thermistor,
   an elongated heater element having an inner and outer surface, a portion of the inner surface thereof wrapped around a substantial portion of the peripheral surface of the thermistor in close heat transfer relation therewith, the heater is formed with a loop and has first and second legs having free distal end portions extending outwardly from the loop, the thermistor is received in the loop, and two terminal pads are provided, the free distal end portions disposed on respective terminal pads,
   a thin layer of electrically insulative material intermediate the thermistor and the heater element, and
   means to electrically connect the heater to the load.

2. An assembly according to claim 1 in which the heater physically supports the thermistor.

3. An assembly according to claim 1 in which the thermistor has a positive temperature coefficient of resistance.

4. An assembly according to claim 1 in which the thermistor has a negative temperature coefficient of resistance.

5. An overcurrent sensor assembly to control the operation of an electrical load having a selected ultimate trip current level and a selected short trip time at corresponding values of overload current comprising
   a temperature dependent thermistor having an outer peripheral surface,
   electrical leads connected to spaced portions of the thermistor,
   an elongated heater element having an inner and outer surface, a portion of the inner surface thereof wrapped around a substantial portion of the peripheral surface of the thermistor in close heat transfer relation therewith,
   a thin layer of electrically insulative material intermediate the thermistor and the heater element,
   means to limit temperature overshoot of the thermistor, and
   means to electrically connect the heater to the load.

6. An assembly according to claim 5 in which the means to limit temperature overshoot comprises an elongated heat sink wrapped around a portion of the outer surface of heater element and a thin layer of electrically insulative material intermediate the heat sink and the heater element.

7. An overcurrent sensor assembly to control the operation of an electrical load having a selected ultimate trip current level and a selected short trip time at corresponding values of overload current comprising
   a temperature dependent thermistor,
   electrical leads connected to spaced portions of the thermistor,
   a first heater element having a portion thereof in intimate heat transfer relation with the thermistor,
   a thin layer of electrically insulative material intermediate the thermistor and the heater element,
   means to electrically connect the heater to the load, and
   means to adjust ultimate trip time of the assembly while having essentially no effect on the short trip time at corresponding values of overload current.

8. An assembly according to claim 7 in which the means to adjust the ultimate trip time is a second elongated heater element electrically connected across the first heater element.

9. An assembly according to claim 8 including two terminal pads, the first and second heater elements electrically connected to and physically supported on respective pads.

10. An assembly according to claim 7 in which the first heater element has a first and second surface, the thermistor is disposed contiguous to the first surface, electrically insulative material is disposed intermediate the first heater element and the thermistor, a heat sink is disposed contiguous to the second surface and electrically insulative material is disposed intermediate the heat sink and the first heater element.

11. An assembly according to claim 10 including a second elongated heater element physically spaced from the heat sink and electrically connected in parallel circuit relation with the first heater element.

12. An assembly according to claim 11 in which the second heater element is in the form of a spiral disposed about the thermistor, first heater element and the heat sink.

13. An assembly according to claim 11 in which the second heater element is generally U-shaped.

* * * * *